United States Patent [19]

Sargeant

[11] Patent Number: 5,066,882
[45] Date of Patent: Nov. 19, 1991

[54] STATOR CORE ASSEMBLY

[75] Inventor: John B. Sargeant, Oviedo, Fla.

[73] Assignee: Westinghouse Electric Corp., Pittsburgh, Pa.

[21] Appl. No.: 637,721

[22] Filed: Jan. 7, 1991

[51] Int. Cl.⁵ .............................................. H02K 5/04
[52] U.S. Cl. ..................................... 310/217; 310/53; 310/54; 310/52
[58] Field of Search ...................... 310/52, 53, 54, 58, 310/217, 258, 259; 29/596

[56] References Cited

U.S. PATENT DOCUMENTS 4,810,919  3/1989  Ponce et al. ........................ 310/217
4,896,062  1/1990  Pollard ............................. 310/68 D Primary Examiner—Steven L. Stephan
Assistant Examiner—Edward H. To

[57] ABSTRACT

In a stator core assembly composed of a plurality of steel punchings, and a plurality of fastening devices including bolts holding the punchings together in a stack and pressing adjacent punchings against one another, the bolts being of a material having a coefficient of thermal expansion different from that of the steel punchings, the bolts are constituted by hollow tubes and the assembly further includes a temperature control device for introducing a fluid having a selected temperature to the interior of the tubes in order to minimize temperature dependent changes in the compressive force exerted by the fastening devices on the stack.

9 Claims, 1 Drawing Sheet

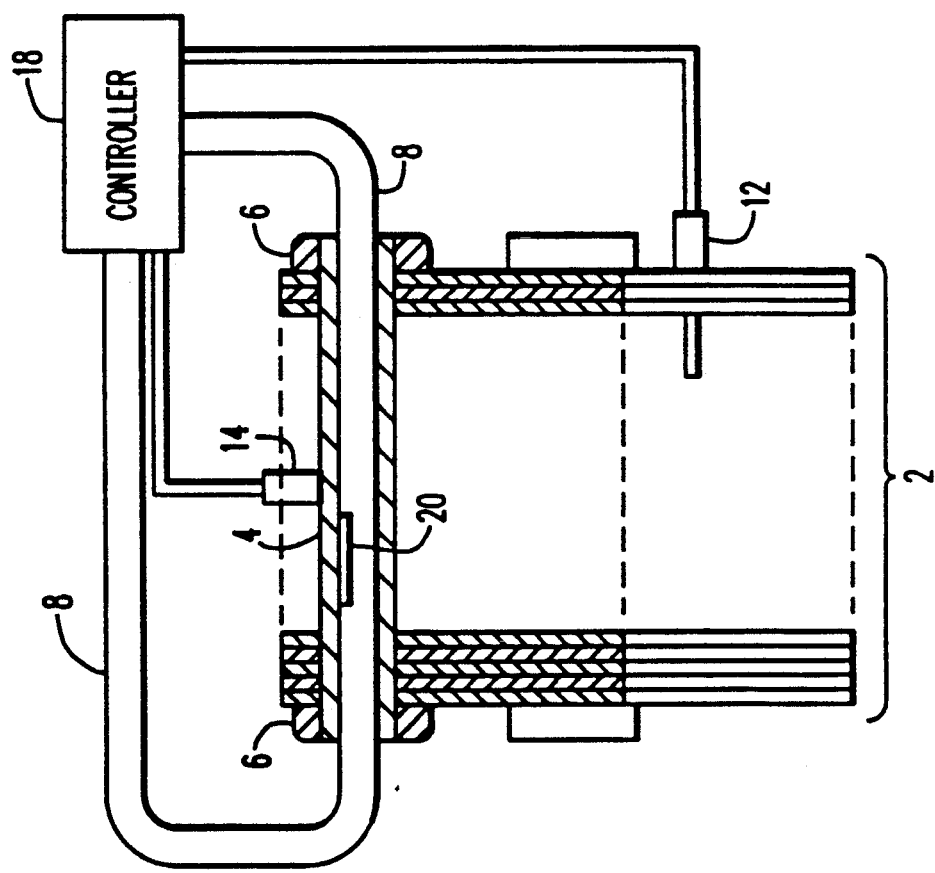

STATOR CORE ASSEMBLY

BACKGROUND OF THE INVENTION

The present invention relates to stator core assemblies for rotating machines of the type whose stator is composed of a plurality of stator core members, or punchings, secured together in a stack by a plurality of bolts distributed around the circumference of the assembly and extending parallel to the machine axis of rotation.

The stator core members are clamped together by the bolts and it is important, particularly during the operation of large generators, to maintain the force with which the stator members are clamped together at a specified level. It is impossible to maintain a substantially constant clamping force in known assemblies because the temperature of such a machine varies considerably from starting to normal operating temperature and suitable bolt materials have a substantially higher coefficient of thermal expansion than do the laminated silicon steel punchings commonly used to form the core stack. As a result, the clamping force imposed on the stack either becomes too low during operation or must be set higher than desired during manufacture. In the former case, the desired level of core tightness is not maintained; in the latter case more stringent strength requirements are imposed on the structural members of the stator core.

Moreover, since such a stator core assembly is frequently required to be capable of operating at low temperature, the assembly must be capable of supporting loads greater than that established during manufacture.

Thus, known stator core assemblies must either be overbuilt to support higher clamping loads than required for proper operation, or be allowed to operate without optimum tightness.

SUMMARY OF THE INVENTION

It is an object of the invention to reduce the temperature dependent variations in the clamping pressure imposed on a stator core assembly.

A more specific object of the invention is to reduce the difference in temperature dependent expansion between stator punchings and stator clamping bolts.

A further specific object of the invention is to provide a novel bolt structure which allows the above purposes to be achieved.

The above and other objects are achieved, according to the present invention, in a stator core assembly comprising a plurality of steel punchings, and a plurality of fastening devices including bolts holding the punchings together in a stack and pressing adjacent punchings against one another, the bolts being of a material having a coefficient of thermal expansion different from that of the steel punchings, by the improvement wherein: the bolts are constituted by hollow tubes; and the assembly further comprises temperature control means for introducing a fluid having a selected temperature to the interior of the tubes in order to minimize temperature dependent changes in the compressive force exerted by the fastening devices on the stack.

BRIEF DESCRIPTION OF THE DRAWING

The sole Figure is a pictorial view of a stator core assembly according to the invention.

DESCRIPTION OF THE PREFERRED EMBODIMENTS

The Figure shows, in simplified pictorial form, a stator core assembly according to the invention for use in a rotating machine. Since the assembly is virtually identical in appearance to conventional assemblies, no particular details are shown.

The stator core assembly is composed of a stack 2 of stator core punchings, or laminations, which are clamped together by a plurality of bolts 4 which extend parallel to the axis of rotation of the machine. The punchings are preferably made of silicon steel and bolts 4 are preferably made of nonmagnetic, high strength steel which inherently has a coefficient of thermal expansion higher than that of silicon steel. Stack 2 is placed under compressive load by tightening nuts 6 at the ends of each bolt 4. When the temperature of the stator core assembly varies, the compression load on stack 2 could be maintained constant if any linear thermal expansion or contraction of stack 2 is equal to the linear thermal expansion or contraction of bolts 4 in the direction of the machine axis. According to the present invention, this is achieved by constructing bolts 4 as thick walled hollow tubes and connecting the ends of the passage through each tube to a supply 8 of fluid. Supply 8 delivers fluid to the passage through each bolt 4 in such a manner as to maintain bolts 4 at the temperature which imposes on bolts 4 a linear thermal expansion or contraction equal to that experienced by stack 4 in the direction of the machine axis.

Since the coefficient of thermal expansion of the material of bolts 4 is different from that of stator 2, bolts 4 must be brought to a temperature different from that of stator 2. The desired relation between these temperatures may be derived as follows.

$$\frac{\Delta l_{ST}}{L_{ST}} = \alpha_{ST} \Delta T_{ST},$$

$$\frac{\Delta l_B}{L_B} = \alpha_B \Delta T_B,$$

where
the subscript ST refers to stator 2,
the subscript B refers to bolts 4,
$\Delta l$ is the change in dimension along the machine axis as a function of change in temperature if the part were unrestrained by the other part,
L is the corresponding dimension of the part at a reference
temperature $T_{ref}$, which may be, for example, normal room temperature,
$\alpha$ is the coefficient of linear thermal expansion of the part, and
$\Delta T$ is the difference in temperature of the part from the reference temperature.

If it is assumed that $L_{ST} = L_B$, then the desired condition, $\Delta l_{ST} = \Delta l_B$, will occur if:

$$\Delta T_B = \frac{\alpha_{ST}}{\alpha_B} \cdot \Delta T_{ST} \quad (1)$$

To create condition, it is only necessary to bring bolts 4 to the temperature $T_B$ at which $$T_B = T_{ref} + \Delta T_B \text{ when}$$

$$T_{ST} = T_{ref} + \Delta T_{ST}.$$

Since $\alpha_{ST}/\alpha_B < 1$, then $$\Delta T_B \Delta T_{ST} < 1.$$

In other words, if $T_{ST} > T_{ref}$, i.e. $\Delta T_{ST}$ is positive, then $$T_B < T_{ST},$$

while if $T_{ST} T_{ref}$, then $$T_B > T_{ST}.$$

The fluid supplied to bolts 4 must be at a temperature between $T_{ref}$ and $T_{ST}$ and bolts 4 can then be maintained at $T_B$ by controlling the flow rate and/or temperature of the fluid.

It is contemplated that the invention will typically be implemented in a simple manner on the basis of calculations or preliminary observations of the nominal operating temperature of the stator core. Based on this information and Equation (1), the flow rate and/or temperature of the fluid supplied to bolts 4 will be adjusted to maintain the temperature of bolts 4 substantially at $T_B$.

However, the invention may alternatively be implemented in a manner which takes account of actual variations in stator core temperature. For this purpose, at least one temperature sensor 12 is provided for monitoring the temperature of the laminations of stack 2 and at least one temperature sensor 14 is provided for monitoring the temperature of bolts 4. Sensors 12 and 14 supply temperature signals to a controller 18 which is also coupled to supply 8 and controls the flow rate and/or temperature of the fluid flowing through the passages in bolts 4 in a manner to establish, and maintain, a value of $T_B$ which satisfies equation (1).

The structure and operation of controller 18 can be in accordance with principles known in the art and will not be described in detail here.

Thus, in an assembly according to the invention, a constant tightness, or compressive loading, is maintained for stack 2 over the entire operating temperature range of the machine. Indeed, to the extent that the permissible operating temperature range is determined by temperature influences on stack tightness, the invention allows this operating temperature range to be increased.

In addition, the invention provides a number of further benefits. For example, the axial passage in each bolt 4 can be employed for direct measurement of bolt length to aid in determining actual changes in the length of the bolts.

Cooling medium can be passed through the passages in bolts 4 in a manner to bring bolts 4 to a temperature lower than that indicated by equation (1) in order to compensate for an initial stack tightness which is lower than desired.

During initial tightening, bolts 4 can be heated to facilitate initial tightening. Heating can be effected by a heater 20 adjacent bolt 4 or by delivering a heated medium through bolt 4 via supply 8.

The interior surface of the tube constituting each bolt 4 can be tapped at both ends of bolt 4 to fit a male element of a hydraulic tensioning device. This can eliminate the need for making each bolt longer than would otherwise be necessary for attachment of nuts 6 since the hydraulic tensioning device will not interfere with initial mounting of a nut 6 at the bolt end engaged by the hydraulic tensioning device.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. In a stator core assembly comprising a plurality of steel punchings, and a plurality of fastening devices including bolts holding the punchings together in a stack and pressing adjacent punchings against one another, the bolts being of a material having a coefficient of thermal expansion different from that of the steel punchings, the improvement wherein: said bolts are constituted by hollow tubes; and said assembly further comprises temperature control means for introducing a fluid having a selected temperature to the interior of said tubes in order to minimize temperature dependent changes in the compressive force exerted by said fastening devices on said stack.

2. An assembly as defined in claim 1 wherein said temperature control means are operative to cause the temperature of said tubes to approach a value $T_B$ such that $$\Delta T_B = \frac{\alpha_{ST}}{\alpha_B} \cdot \Delta T_{ST}$$

where,
 $\alpha_{ST}$ is the coefficient of linear thermal expansion of said steel punchings,
 $\alpha_B$ is the coefficient of linear thermal expansion of said hollow tubes,
 $\Delta T_{ST}$ is the difference in temperature of said steel punchings from a reference temperature at which a desired compressive force is produced, and
 $\Delta T_B$ is the difference in temperature of said hollow tubes from a reference temperature at which a desired compressive force is produced.

3. An assembly as defined in claim 1 wherein said temperature control means comprise:
 means disposed for monitoring the temperature of the stack and the temperature of the bolts; and fluid control means connected to be controlled by the readings produced by said monitoring means in order to control the fluid introduced into the interior of said tubes.

4. An assembly as defined in claim 3 wherein said fluid control means are operative for controlling the temperature of the fluid.

5. An assembly as defined in claim 3 wherein said temperature control means are operative for controlling the flow rate of the fluid.

6. An assembly as defined in 1 further comprising means for heating each said bolt.

7. A method for controlling the compressive force exerted by a plurality of bolts on a stator core assembly, the stator core assembly including a plurality of steel punchings held together in a stack, and pressed against one another, by the bolts, each bolt being constituted by a hollow tube, said method comprising:

monitoring the temperatures of the bolts and the punchings;

causing a fluid to flow through each hollow tube; and controlling the fluid in a manner to minimize temperature dependent changes in the compression forces exerted by the bolts on the stack.

8. A method as defined in claim 7 wherein said step of controlling the fluid comprises giving the fluid a selected temperature and controlling the rate of flow of fluid through each of the hollow tubes.

9. A method as defined in claim 7 wherein said step of controlling the fluid is carried out to cause the temperature of said tubes to approach a value $T_B$ such that $$\Delta T_B = \frac{\alpha_{ST}}{\alpha_B} \cdot \Delta T_{ST}$$

where,
$\alpha_{ST}$ is the coefficient of linear thermal expansion of said steel punchings,
$\alpha_B$ is the coefficient of linear thermal expansion of said hollow tubes,
$\Delta T_{ST}$ is the difference in temperature of said steel punchings from a reference temperature at which a desired compressive force is produced, and
$\Delta T_B$ is the difference in temperature of said hollow tubes from a reference temperature at which a desired compressive force is produced.

* * * * *